T. E. MURRAY, Jr.
APPARATUS FOR ELECTRICAL WELDING.
APPLICATION FILED MAY 5, 1917.
1,252,145.
Patented Jan. 1, 1918.
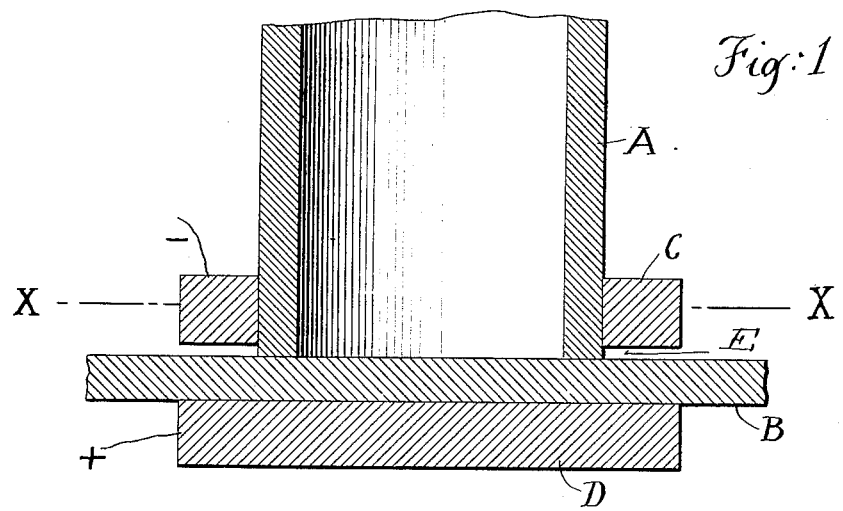
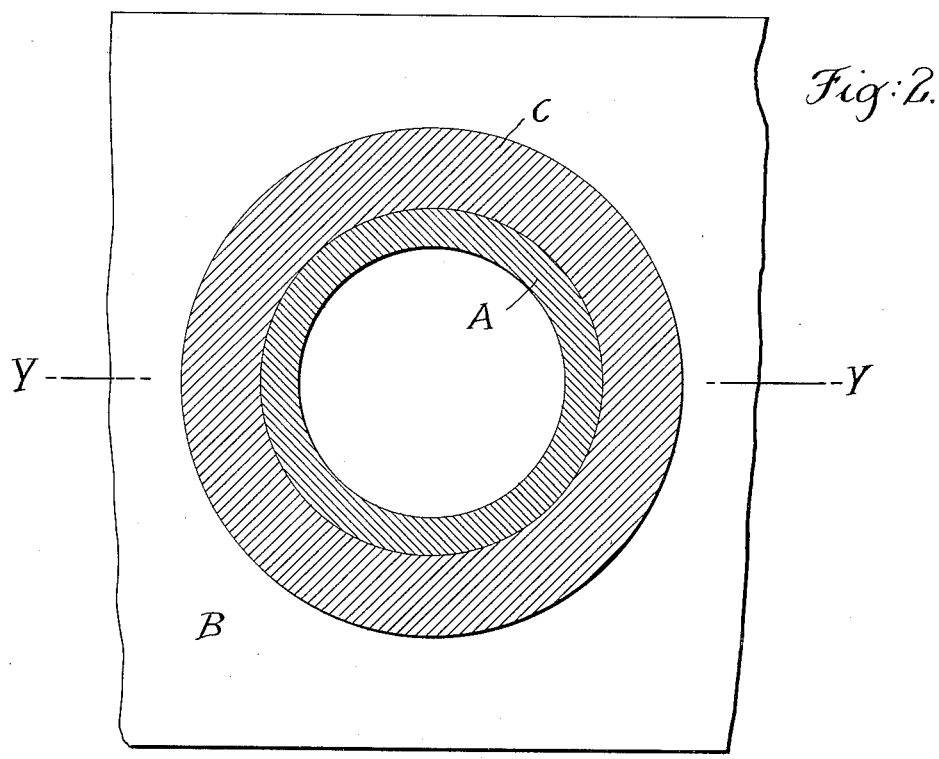

UNITED STATES PATENT OFFICE.

THOMAS E. MURRAY, JR., OF BROOKLYN, NEW YORK.

APPARATUS FOR ELECTRICAL WELDING.

1,252,145.  Specification of Letters Patent.  Patented Jan. 1, 1918.

Application filed May 5, 1917. Serial No. 166,565.

*To all whom it may concern:*

Be it known that I, THOMAS E. MURRAY, Jr., a citizen of the United States, residing at Brooklyn, in the county of Kings and State of New York, have invented a certain new and useful Improvement in Apparatus for Electrical Welding, of which the following is a specification.

The invention is an apparatus for electrical welding, whereby and wherein impairment of the circuit between a terminal thereof and one of the bodies to be welded connected thereto, and due to the expansion of said body through the heating effect of the welding current, is prevented.

I place one of the bodies to be welded in a ring electrode made of a material of greater electrical conductivity than the body itself. The welding current then exercises its maximum effect at the joint, and so highly heats the surrounded body to a degree very much in excess of that to which it heats the ring electrode. Hence the body expands to a greater extent than the electrode does, and as a consequence a tight joint is formed between its outer periphery and the inner periphery of the electrode, as hereinafter set forth.

In the accompanying drawings—

Figure 1 is a section of the end portion of a pipe, a plate to which said pipe is to be welded, and the electrodes, on the line Y, Y of Fig. 2. Fig. 2 is a section on the line X, X of Fig. 1.

Similar letters of reference indicate like parts.

A is the end portion of a metal pipe, which is to be electrically welded to the plate B. C is an electrode, in annular form, which surrounds and fits upon the pipe A near the extremity thereof. D is an electrode which is in contact with plate B. There is a gap E between electrode C and electrode D.

The electrode C is to be of a material of greater conductivity than the material of pipe A. In practice, the electrode C may be of copper and the pipe A of iron. Copper being of greater electrical conductivity than iron, the current will meet relatively little resistance in traversing the electrode C, and, therefore, exercise comparatively little heating effect thereon. On the other hand, the maximum heating effect of the current will take place at the joint between pipe A and plate B, and hence the iron of the pipe at its welded extremity will become highly heated and expand more than the copper ring C will expand, with the result that the greater the expansion of the iron pipe, the more perfect will be the contact between said pipe and said ring electrode, and hence the less the resistance between said pipe and said electrode will become. In this way, a practically perfect electrical contact is always maintained between the pipe and the ring electrode.

I claim:

1. An apparatus for electrical welding, comprising an electrode having an opening constructed to receive and fit upon one of the bodies to be welded, and an electrode connected to the other of said bodies, the first-named electrode being of a material having greater electrical conductivity than said received body.

2. An apparatus for electrical welding, comprising an electrode annular in form surrounding and fitting upon one of the bodies to be welded, and an electrode connected to the other of said bodies: the first-named electrode being of a material having greater electrical conductivity than said surrounded body.

3. An apparatus for electrically welding a pipe to the surface of a plate or block, comprising an annular electrode fitting upon said pipe and of a material of greater electrical conductivity than said pipe, and an electrode in contact with the side of said plate or block opposite to that upon which the welded joint is made.

In testimony whereof I have affixed my signature in presence of two witnesses.

THOMAS E. MURRAY, JR.

Witnesses:
GERTRUDE T. PORTER,
MAY T. McGARRY.

Copies of this patent may be obtained for five cents each, by addressing the "Commissioner of Patents, Washington, D. C."